Figure 1:
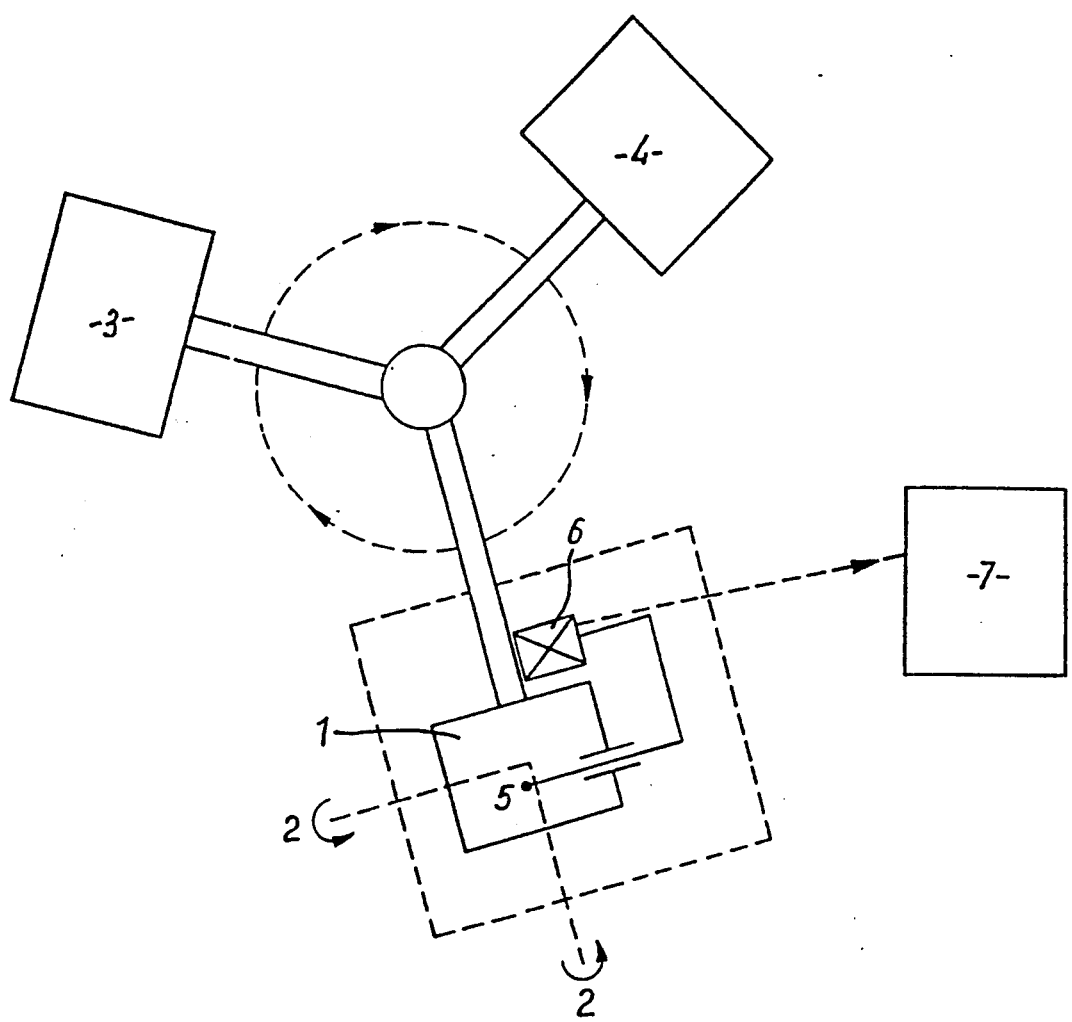

United States Patent [19]
Crawford et al.

[11] Patent Number: 5,322,654
[45] Date of Patent: Jun. 21, 1994

[54] ROTATIONAL MOULDING APPARATUS AND PROCESS

[75] Inventors: Robert J. Crawford, Billsborough; Paul J. Nugent, Belfast, both of United Kingdom

[73] Assignee: The Queen's University of Belfast, Belfast, United Kingdom

[21] Appl. No.: 847,105

[22] PCT Filed: Oct. 11, 1990

[86] PCT No.: PCT/GB90/01569
§ 371 Date: Jun. 4, 1992
§ 102(e) Date: Jun. 4, 1992

[87] PCT Pub. No.: WO91/05647
PCT Pub. Date: May 2, 1991

[30] Foreign Application Priority Data
Oct. 14, 1989 [GB] United Kingdom ............... 8923207

[51] Int. Cl.⁵ ............... B29C 33/02; B29C 33/40; B29C 41/04
[52] U.S. Cl. ............... 264/40.1; 264/40.6; 264/310; 425/143; 425/144; 425/150; 425/170; 425/439
[58] Field of Search ............... 264/310, 311, 40.1, 264/40.6, 301, 302, DIG. 60; 425/143, 144, 429, 439, 150, 170

[56] References Cited

U.S. PATENT DOCUMENTS

| | | | |
|---|---|---|---|
| 3,796,533 | 3/1974 | Vox | 425/435 X |
| 4,217,325 | 8/1980 | Colby | 264/310 X |
| 4,235,577 | 11/1980 | Groleau | 425/144 |
| 4,371,483 | 2/1983 | Mattson | 425/144 X |
| 4,422,987 | 12/1983 | Arimatsu | 264/40.6 X |
| 4,455,268 | 6/1984 | Hinrichs et al. | 264/236 X |
| 4,589,072 | 5/1986 | Arimatsu | 264/40.1 X |
| 4,725,389 | 2/1988 | Hahn et al. | 425/144 X |
| 4,740,337 | 4/1988 | Gale et al. | 264/302 X |
| 4,800,050 | 1/1989 | Hahn et al. | 425/143 X |
| 4,810,438 | 3/1989 | Webster et al. | 264/236 X |
| 4,933,126 | 6/1990 | Shuman | 264/40.1 X |
| 5,038,709 | 8/1991 | Yamada et al. | 425/143 X |
| 5,055,245 | 10/1991 | Hisatomo et al. | 425/143 X |
| 5,194,197 | 3/1993 | Munk | 264/40.6 X |

FOREIGN PATENT DOCUMENTS

| | | | |
|---|---|---|---|
| 2288025 | 12/1987 | Japan | 264/40.6 |
| 2136114 | 9/1984 | United Kingdom | 264/40.6 |

Primary Examiner—Karen Aftergut
Attorney, Agent, or Firm—Salter, Michaelson & Benson

[57] ABSTRACT

A rotational moulding apparatus includes a device (5) disposed inside the mould for measuring temperature. A processor (6) forming part of a feedback tool (7) enables real time monitoring and control of the moulding process. Identifiable points on the temperature time moulding characteristic are employed to control the operation of the apparatus to optimise the properties of the mouldings obtained.

20 Claims, 2 Drawing Sheets

ROTATIONAL MOULDING APPARATUS AND PROCESS

The present invention relates to apparatus for and a method of rotational moulding.

Rotational moulding is a processing method for producing hollow articles made of synthetic plastics material. It consists of three basic stages. Initially, cold plastics powder (or granules) is placed in a sheet metal (or cast alloy) mould. The mould is closed and is rotated simultaneously about two perpendicular axes. Whilst rotating the mould moves into an oven and as the metal surface becomes hot, the plastic in the mould starts to melt and coat the inside surface of the mould. When all the plastics powder has melted and a uniform coating has formed on the mould, it is taken out of the oven and, still rotating, it is cooled by an air and/or water spray. When the plastics has solidified the mould is opened and the moulding is removed.

The rotational moulding technique has been used commercially for about 30 years but there are a number of practical problems. Firstly, it is very difficult to know when the powder has melted. This is usually estabished by trial and error and results in a considerable amount of wasted material. This is because the heat transfer characteristics can vary depending on the type of oven used to heat the mould, the ambient conditions, the nature of the powder, the type of plastics, the wall thickness of the moulding, the material and thickness of the mould etc. Also, even when the powder has melted it is difficult to know how long the mould should be left in the oven to get optimum properties from the moulded article.

According to one aspect of the present invention, there is provided a rotational moulding apparatus comprising a mould, means for rotating the mould and means for measuring the temperature of the medium inside the mould but outside the material being moulded in order to provide a means for controlling the moulding process.

According to another aspect of the present invention, there is provided a method of rotational moulding comprising the steps of introducing moulding materials into the mould, heating and rotating the mould and monitoring the temperature of the medium inside the mould but outside the material being moulded and controlling the operation of the moulding machine in dependence upon the temperature monitored.

In a preferred embodiment, variation of temperature with time is plotted and three unique points on that plot are determined respectively representing when al the plastics material is melted, when the moulded article has achieved its optimum properties and when demoulding can take place. The first point is located at and identified by means of a discontinuity in the heating up part of the temperature time characteristic. The second point is determined by testing the properties of moulded articles at temperatures above the fusion temperatures for different moulding materials. In this way, the second point on the characteristic at which these properties are achieved can be accurately predicted, and by monitoring the temperature, articles having these properties can be produced. The third point is located at and identified by means of a discontinuity in the cooling down part of the temperature - time characteristic.

Temperature is monitored inside the mould by any appropriate temperature monitoring device. The device can be connected to a processor which can in turn be used to control the moulding process. If desired, the device may emit a continuous signal so that an instant temperature readout is obtained. Alternatively, a data logger for logging the temperature may be used in place of the monitoring device and processor, but this would not provide an instantaneous read out.

Figure 2:
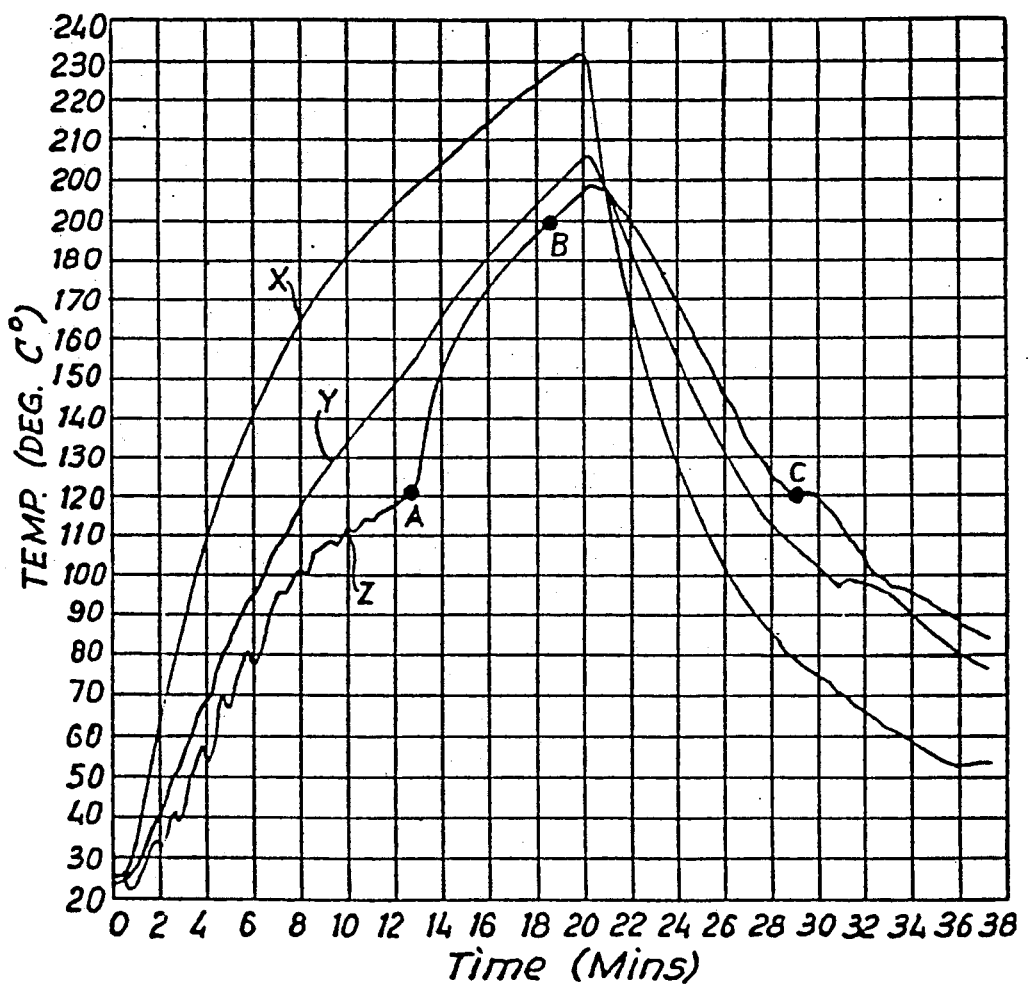

In order that the invention may be more clearly understood, one embodiment thereof will now be described, by way of example, with reference to the accompanying drawings, in which:

FIG. 1 shows a diagrammatic view of rotational moulding apparatus according to the invention, and FIG. 2 is a graph of the variation of temperature with time inside the mould of the apparatus of FIG. 1.

Referring to FIG. 1, the rotational moulding apparatus comprises a rotatable mould 1, means 2 for rotating the mould about two perpendicular axes, an oven 3 for heating the mould and an air or water spray 4 for cooling the mould down. A device 5 is disposed inside the mould 1 for measuring the temperature inside the mould and a procesor 6 is connected to that device 5 for processing the temperature monitored. This processor forms part of a feedback loop which enables the moulding process to be controlled in real time in dependence upon the temperature monitored by means of a control system 7.

Referring to FIG. 2 lines X, Y and Z represent variations of temperature with time for the outside surface of mould 1, the inside surface of the mould 1 and the air within the mould 1 respectively. Temperatures for line Z are measured by device 5. Temperatures for lines X and Y are provided for comparison. Line Z exhibits a sharp kink (pt. A) This indicates the time at which the powder has all melted. At point B the optimum part properties have been achieved. Shorter or longer heating times will result in significantly reduced properties. Point C indicates the point at which the melt has solidified.

Point A is independent of any of the variables mentioned in the introduction above and is purely a function of the heat transfer conditions. Optimum mechanical properties of the moulded article co-incide with a precise temperature of the air inside the mould represented by point B. These points are unique. Point A is determined because it is located at a discontinuity of line Z. Point B is determined by testing the moulded article against temperature for various materials and various temperatures above the fusion temperature of all the material represented by point A. Point C indicates the time which must elapse before de-moulding can take place.

Thus measurement of the air inside the mould enables a moulder to (a) identify the Point at which the powder (or granules) has all melted (b) identify the condition at which optimum Part properties are achieved and (c) control the operation of the machine in order to optimise the properties of the mouldings. The processor 6 may emit a signal when either or both of the temperatures at points A and B are reached. The signal emitted is received by the control system 7 which controls the moulding process in dependence upon the signal received as indicated earlier. The signal may be transmitted at any appropriate frequency, for example, at a radio frequency or at an infra-red frequency.

It will be appreciated that the above embodiment has been described by way of example only and that many variations are possible without departing from the invention. For example, instead of automatic control by means of an automatic control system, the moulding process may be manually controlled by an operative in dependence upon the temperature monitored. The temperature externally of the mould may also be measured and that measurement fed to the processor for conversion to a signal to be transmitted to the control system. This in turn may be used to monitor the heating efficiency of the mould. Also the processor may, in an alternative to the signal emission arrangement, be connected to the control system via slip rings.

We claim:

1. A rotational moulding apparatus for moulding a hollow article, said rotational moulding apparatus comprising a mould for receiving a moulding material, means for rotating the mould, means for measuring a temperature of a medium inside the hollow article being moulded in the mould during a moulding process, and means for controlling operation of the rotational moulding apparatus in dependence upon the measured temperature of the medium.

2. A rotational moulding apparatus as claimed in claim 1, in which the means for measuring temperature comprises a temperature monitoring device connected to a processor.

3. A rotational moulding apparatus as claimed in claim 2, in which the processor is disposed in a feedback loop to control the moulding process.

4. A rotational moulding apparatus as claimed in claim 3, in which the processor is operative to emit a continuous signal so that an instant temperature readout is obtained.

5. A rotational moulding apparatus as claimed in claim 4, in which the continuous signal is received in real time by a control system disposed in the feedback loop.

6. A rotational moulding apparatus as claimed in claim 4, in which the signal is an infra-red signal.

7. A rotational moulding apparatus as claimed in claim 4 in which the signal is a radio signal.

8. A rotational moulding apparatus as claimed in claim 1, in which the means for measuring temperature comprises a data logger for logging the temperature.

9. A method of rotationally moulding a hollow article comprising the steps of introducing a moulding material into a mould of a rotational moulding apparatus, heating and rotating the mould, monitoring a temperature of a medium inside the hollow article being moulded in the mould, and controlling operation of the rotational moulding apparatus in dependence upon the monitored temperature of the medium.

10. A method of rotational moulding as claimed in claim 9, in which a signal is produced from the monitored temperature and transmitted continuously to a control system which operates to control the moulding process in dependence upon the signal received.

11. A method of rotational moulding as claimed in claim 10, in which the signal is a radio signal.

12. A method of rotational moulding as claimed in claim 10, in which the signal is an infra-red signal.

13. A method of rotational moulding as claimed in claim 9, in which the temperature is measured with time to produce a temperature time characteristic record.

14. A method of rotational moulding as claimed in claim 13, in which a first point is determined on the temperature time characteristic record representing when all the moulding material is melted, said first point being located at and identified by means of a discontinuity in a heating up part of the temperature time characteristic record.

15. A method of rotational moulding as claimed in claim 14, in which a second point is determined on the temperature time characteristic record representing when the moulded article has achieved its optimum properties, said second point being identified by testing properties of moulded articles at temperatures above fusion temperatures for different moulding materials.

16. A method of rotational moulding as claimed in claim 15, in which a third point is determined on the temperature time characteristic record, said third point being located at and determined by means of a discontinuity in a cooling down part of the temperature time characteristic record.

17. A rotational moulding apparatus as claimed in claim 5, in which the signal is an infra-red signal.

18. A rotational moulding apparatus as claimed in claim 5, in which the signal is a radio signal.

19. A rotational moulding apparatus for moulding a hollow article, said rotational moulding apparatus comprising:
a mould for receiving a moulding material;
means for rotating the mould, said moulding material coating an inside surface of said mould during rotation so as to form said hollow article;
means for measuring a temperature of a medium inside said hollow article being moulded in said mould during a moulding process;
means for controlling operation of said rotational moulding apparatus in dependence upon said measured temperature of said medium; and 20. A method of rotationally moulding a hollow article comprising the steps of:
introducing a moulding material into a mould of a rotational moulding apparatus;
heating and rotating said mould, said moulding material coating an inside surface of said mould during rotation thus forming a hollow moulded article;
monitoring a temperature of a medium inside said hollow article being moulded in said mould; and
controlling operation of said rotational moulding apparatus in dependence upon said monitored temperature of said medium.

* * * * *